June 1, 1937.  E. J. SMITH ET AL  2,082,556
SUPERCHARGER DRIVE
Filed Oct. 18, 1934  3 Sheets-Sheet 3
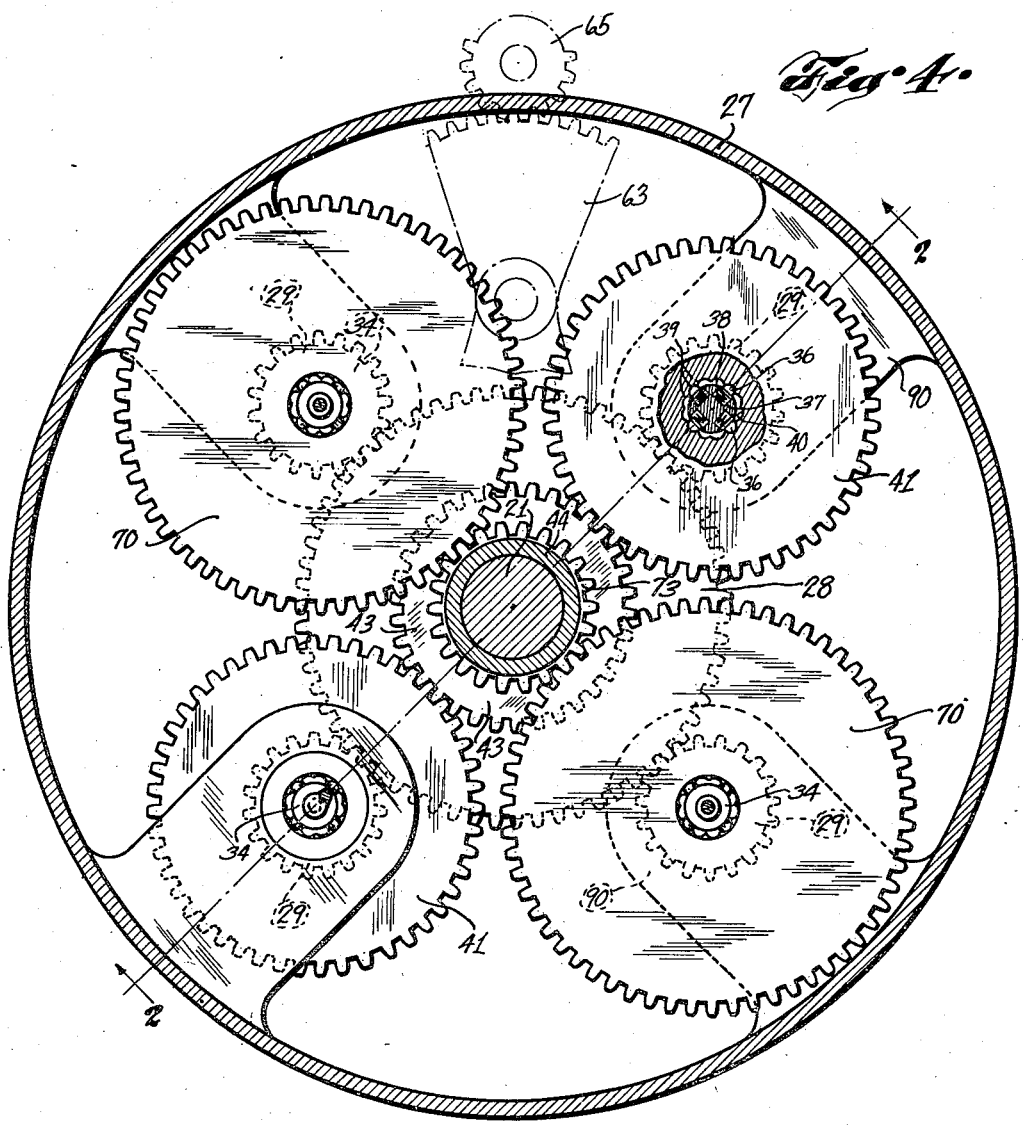
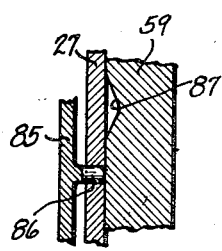
INVENTOR.
EDWARD J. SMITH
EUGENE S. BUSH
BY
Robert B. Terry
ATTORNEY.

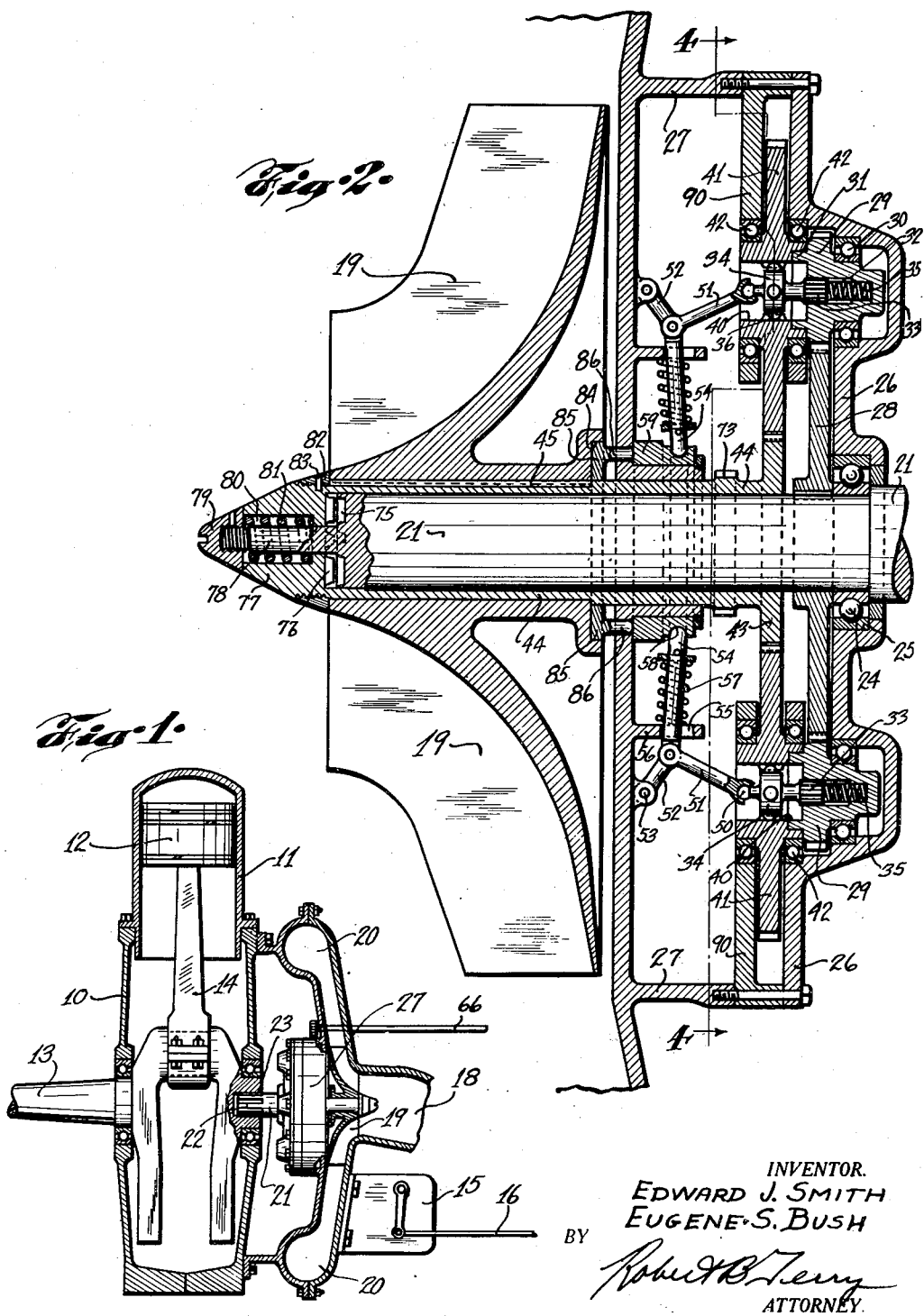

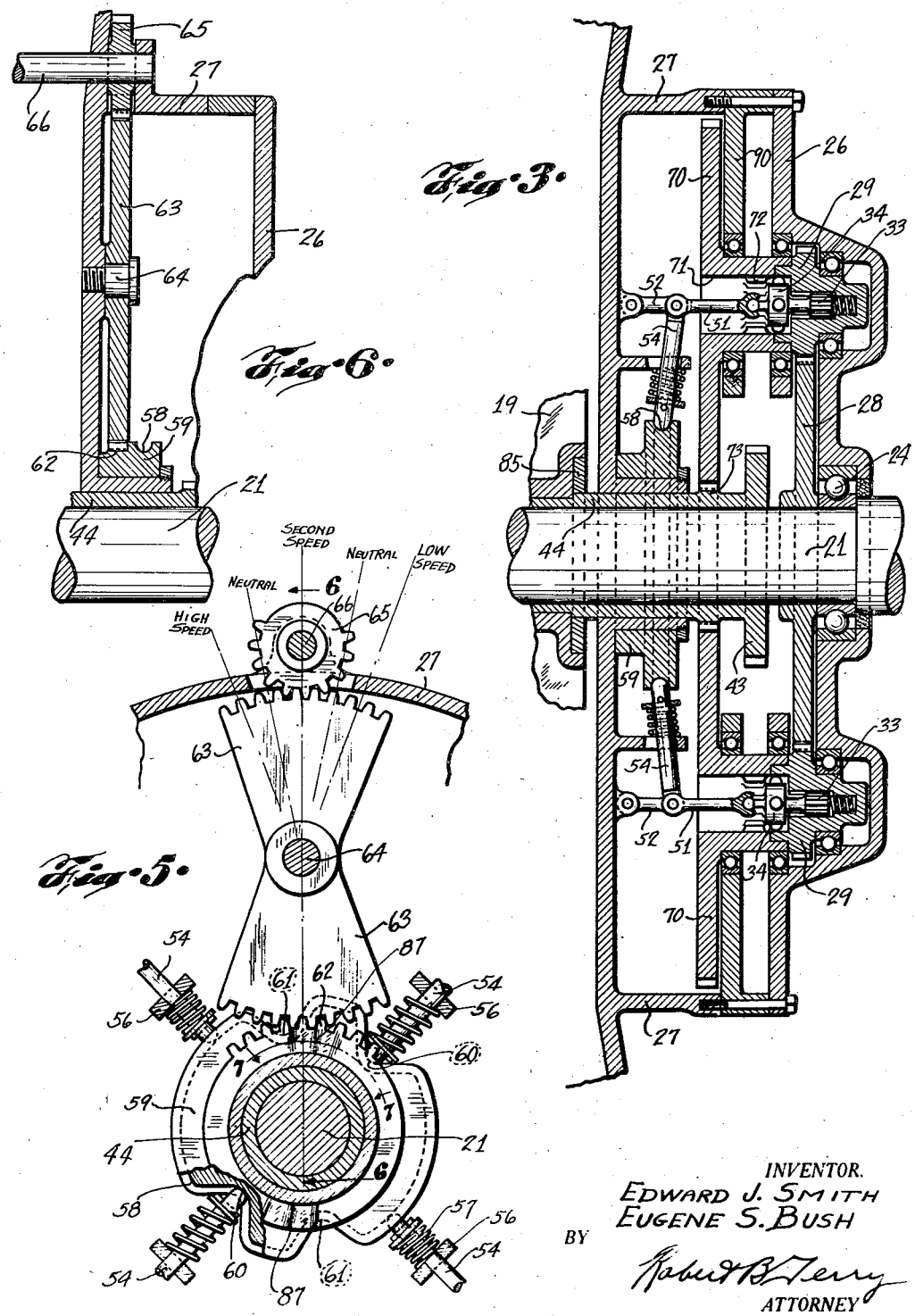

Patented June 1, 1937

2,082,556

UNITED STATES PATENT OFFICE 2,082,556

SUPERCHARGER DRIVE

Edward J. Smith and Eugene S. Bush, St. Louis, Mo.

Application October 18, 1934, Serial No. 748,824

4 Claims. (Cl. 74—359)

This invention relates to improvements in supercharger drives, and more particularly to a variable speed drive adapted for the transmission of driving energy from an internal combustion engine to a supercharger therefor, the device herein disclosed being admirably suited, because of compactness and rigidity of construction, for use with airplane motors and superchargers.

With the advent of improved facilities for high altitude flying there has developed an increased need for a more adequate control of output of superchargers, so as to care more efficiently for the wider range of variation in the manifold pressures normally incident to commercial flying at altitudes varying from zero to, say, thirty thousand feet or over. It is customary in prevailing types of aircraft engines to employ a supercharger of centrifugal type, driven from the engine directly, or by the intervention of a train of gears. Because of the necessary minimization of weight and space requirement, it has heretofore been impractical successfully to employ a speed change transmission of ordinary types to vary the speed and hence the displacement of the blower. Obviously the displacement of the supercharger impeller or rotor should be increased somewhat out of proportion to the motor speed upon encountering atmosphere at the extremely reduced pressures met say at the higher altitudes. It is to the end of meeting these varying requirements that the present invention has its major objective.

Another object of the invention is attained in an improved supercharger drive such that, consistent with the requisite space and weight restrictions, the rapidly rotating parts of the assembly are enabled, in spite of a high rate of rotation, successfully to resist the tremendous centrifugal forces encountered.

Yet another object of the invention is attained in an arrangement permitting a ready selection of any one of a plurality of blower-driving ratios while the engine is in operation at speed, and yet obviating any hazardous shearing stresses or adverse torque conditions incident to a change of driving ratio.

Still another object of the invention is attained in a compact speed change transmission for the purpose noted, and which is particularly adapted for remote mechanical control, and which is further particularly adapted to a combination with supercharger driving assemblies for internal combustion engines generally.

The foregoing and other objects will more clearly appear from the following detailed description of a preferred embodiment of the invention, considered in connection with the accompanying drawings, in which:

Fig. 1 is a vertical sectional elevation through an aircraft engine of radial type, into which is built a supercharger and variable speed drive constructed in accordance with the principles of the present invention; Fig. 2 is an enlarged vertical section through the supercharger and drive assembly as viewed along line 2—2 of Fig. 4; Fig. 3 is a vertical sectional elevation through the blower drive assembly, but illustrating other of the speed control elements in a different position than those shown by Fig 2; Fig. 4 is a sectional elevation along a plane at right angles to the axis of the rotation, and as viewed along line 4—4 of Fig. 2, illustrating particularly a preferred arrangement of the gear elements of the variable speed drive; Fig. 5 is a fragmentary, partly diagrammatic showing of certain of the control elements; Fig. 6 is a vertical sectional elevation taken along line 6—6 of Fig. 5, and further illustrating several of the control elements shown by Fig. 5, and Fig. 7 is a detailed view taken along the curved plane 7—7 of Fig. 5, and further illustrating a detail of the control arrangement.

Referring now by characters of reference to the drawings, there is shown by Fig. 1, an exemplifying adaptation of the present invention to an aircraft motor 10 of radial type. The engine cylinders, one of which is shown at 11, each serves for the operative reception of a power piston 12. The forward end of the engine is characterized by a crankshaft projection 13 serving to receive the usual propeller hub or boss (not shown), connection being made to the crank from each piston, as by a connecting rod 14. Rearwardly of the engine is located a carburetor 15 provided with a throttle (not shown) which may be of any suitable or usual type controlled by a throttle control rod 16.

In accordance with prevailing practice, or as preferred, the supercharger is arranged through connections (not shown) to augment the intake air pressure, the supercharger assembly being provided with an inlet passage 18 directed into the central area of a centrifugal impeller or blower element 19. Due to the centrifugal force imparted to the air entering the center of the rotor or impeller 19, the air is discharged peripherally into a volute 20, whence the air, at a volume and pressure proportionate to the speed of the impeller, is directed into the carburetor and/or manifold of the engine.

The impeller 19 derives its energy of rotation from the engine through a shaft 21 provided with a splined driving end 22 (Fig. 1), engaging a correspondingly splined socket portion 23 at the end of the crankshaft 13.

Referring now more particularly to the elements and structure of the variable speed drive, the drive shaft 21 is journalled, preferably in an anti-friction bearing exemplified at 24 and mounted in a cup or recess 25 therefor, formed as part of a detachable wall portion 26 of an oil- and dust-proof housing 27 for the variable speed driving elements, this housing being integral with or formed as a part of the fan or blower volute or enclosure.

Just inwardly of the wall 26 is a gear 28 secured as by a key to the shaft 21, the gear 28 enmeshing with a plurality, (shown as 4) of pinions 29, the axes of the pinions being evenly angularly spaced about the preferably circular housing 27. Each of the pinions 29 is journalled at its outer end in anti-friction preferably ball bearings 30, and at its inner end is provided with a shoulder 31 extending in journalling relation into a recess therefor in an adjacent gear hereinafter described. Each of the pinions 29 is further provided with an axial aperture 32 which is internally splined to receive external splines 33 of a gear clutch head 34, the axial aperture 32 of each of the pinions 29 serving further to house a compression spring 35 engaging at one end the bottom of a socket therefor in the pinion, and at the opposite end bearing upon the splined head 33.

Each of the gear clutch heads 34 embodies one or more spring pressed, radially movable plungers 36 (Fig. 4) each mounted within a radial socket 37 so as to be urged outwardly by the plunger spring 38 into yieldable driving relation with an internally scalloped surface 39 formed within an axial bore 40 of each of the gears 41. As will appear, the relation of the plungers and surface 39 is such that these parts constitute a gear clutch, and since relatively displaceable under excess torque, also serve as an overload release. The latter gears are journalled externally in anti-friction bearings 42 and are laterally recessed to receive in journalling relation the projections 31 of the adjacent pinions 29. The group of gears 41 are of relative larger diameter than the gears 29, are spaced 180° apart, and enmesh in turn with a somewhat smaller gear 43. The latter gear is formed as a part of or secured to a sleeve or hollow shaft 44 extending from the gear 43 along and overlying the shaft 21, the sleeve being journalled thereon but not secured thereto. The sleeve 44 serves as a mounting for the impeller 19 which is secured thereto as by a key 45.

For purposes of control actuation, each of the driving heads 34 is provided at its inner end with a ball head 50, engaged by the socketed end of an arm 51, so pivoted to an arm 52 as to constitute a toggle linkage. The opposite end of arm 52 is pivoted as at 53 to the inner wall of the case 27. Pivotally connected for centering the toggle is a plunger 54, operating through a slot 55 in a bracket 56 projecting inwardly of the adjacent case wall. A spring 57 tends to bias the plunger 54 inwardly along the radius of the assembly and in a direction tending to break the toggle 51—52, and to maintain the inner end of the related plunger 54 in engagement with a groove 58 of a rotatable control cam 59, (Figs. 5 and 6). The cam 59 is provided with a pair of low points 60, which are diametrically opposite each other, and a spaced but correspondingly opposed pair of low points 61, for a purpose hereinafter described. For actuation of the cam 59 this element is extended to form a gear, or a toothed sector portion 62, enmeshing with a fragmentary gear 63, pivoted at 64 and engaged upon its opposite tooth end by a control pinion 65. This pinion is secured to a rotatable control shaft 66, which extends to a convenient point of access, say to the control cockpit or the pilot's instrument board.

It will be observed that the action of cam 59 when rotated to permit the ends of plungers 54 to engage the low points such as 60, is to permit the springs 57 to retract the plungers 54, decentering the toggles 51—52 and actuating the driving heads 34 inwardly to a position of operative engagement with the gears 41. In this position of the heads 34, the gears 41 are directly connected to the pinions 29 through the splined elements 32—33, the action of the springs 35 being to assist this operative connection of the gear-clutch elements.

Referring now to Fig. 3 of the drawings, which is taken on a section at a right angle to that of Fig. 2, it will appear that the gear 28, which is secured to shaft 21, enmeshes with two other diametrally opposed pinions 29, which, for convenience of representation, are shown as being of the same diameter as and substantially identical with the pair thereof illustrated by Fig. 2, and are similarly equipped with the axially displaceable driving heads 33 and coacting control elements. The gear-clutch heads of Fig. 3 are however movable into driving engagement with a pair of diametrally opposed gears 70, each of which is provided, similarly to the gears 41, with an axial bore 71 and an indented or scalloped internal surface 72 for the reception of the plungers 36 of the driving heads 34. The arrangement of gears 70, similarly to that of the gears 41, is planetary, except for the fact that their axes are stationary. The gears 70 engage a drive pinion 73 which, like the gear 43, is formed as a part of or secured to the sleeve 44 rotatably mounted upon the shaft 21. The control elements for actuating the gear-clutch heads 34 into and out of engagement with the portion 72 of gears 70, are or may be the same as heretofore described for clutching the gears 41.

It will have appeared from a comparison of Figs. 2 and 3 that when the toggles 51—52 controlling the operative selection of a given set of gears, are centered as shown by Fig. 3, the gear-clutch heads are retracted out of operative engagement with the corresponding gears, while, when the toggles are decentered, as shown by Fig. 2, a given set of gears is operatively connected to the companion pinion 29.

It will appear from Fig. 4 that, for a given speed of shaft 21, the highest driving ratio is attained when driving of the supercharger impeller takes place through shaft 21, gear 28, the pinions 29 associated with the gears 70, and thence to pinion 73. A lower or intermediate ratio is attained in the example shown, when driving takes place through shaft 21, gear 28, gears 41 and the associated pinions, thence to gear 43 and the impeller mounting sleeve 44. In both high and intermediate settings, these groups of gears each constitutes an overdrive between the shaft 21 and the impeller.

A still lower driving rate or ratio is provided for by an arrangement which may be referred to as a direct drive, and which is attainable through axial movement of the sleeve 40 a small distance to the right (Fig. 2), this control movement being effected by means later to be described. At the blower end of shaft 21 is provided a pair or more of diametral recesses 75, adapted to receive a pair of corresponding projections 76 formed on an internal face of a nose element 77 carried by the end of the sleeve 44. The shaft 21 is provided with an outwardly projecting stud 78 threaded to receive at its outer end a cap 79. The element 77 is provided with an axial chamber 80, serving to receive and constitute abutments and anchorage for a spring 81. A threaded collar 82 externally engages the nose element 77 and may be pinned thereto by a member 83. The arrangement of the spring and anchorage is such that the sleeve and impeller are biased to the right (Fig. 2) along the shaft. The impeller is provided near its opposite axial portion with an annular recess 84 which, in operation, rotates about a stationary interfitting element 85. The latter element is provided with plungers 86 of a size to work through suitable apertures therefor in the wall of the case 27, so that the inner ends of the plungers 86 bear against a lateral face of cam 59. The cam is provided with, say, a pair of diametrally opposed recesses 87, one of which is shown in detail in Fig. 7, so that as the cam 59 is rotated to a predetermined position, the plungers 86 permit the sleeve and impeller assembly under the influence of spring 81, to move a sufficient distance along the axis to permit interengagement of projections 76 and recesses 75. It will appear that in this position, the shaft 21 serves directly to drive the impeller at a corresponding rate of rotation.

Assurance against concurrent engagement of the gearing of two ratios at a time is, of course, precluded by the spaced relation of the low points 60 and 61 on cam 59, with respect to the groups of plungers, while the recesses 87, corresponding to direct drive position, are likewise angularly displaced with respect to the other low points.

Referring further to the relation of the controls and control parts, including the cam 59, it will appear from the legends of Fig. 5 that when the element 63 is actuated counterclockwise from the position shown, through a distance sufficient to permit interengagement of the plungers 86 with the recesses 87, the interengagement of projections 76 and recesses 75 causes a direct drive of the blower by shaft 21 at a low speed. As the element 63 is moved clockwise (Fig. 5) to the position of the parts shown, the pair of plungers 54 appearing in Fig. 2, will be permitted to enter the low points 60 of cam 59, decentering one pair of the toggles 51—52, causing springs 35 and 57 to coact in displacing the driving heads 34 into operative connection with the gears 41 to cause, by means described, a setting of the driving elements in the intermediate or second speed position.—It will have been observed that the spacing of the low points and recesses of cam 59, considered in respect to the several control plungers, is such that a neutral position is attained between the low speed and second speed positions.

Assuming now that the member 63 is actuated, through pinion 65, in a clockwise direction (Fig. 5), a neutral position is first encountered in which neither pair of the plungers 54 or 86 engage low points on the cam 59. However, as gear 63 is actuated further in a clockwise direction, low points 61 move counterclockwise to receive the pair of plungers 54 shown by Fig. 3, causing, by agencies described, the driving heads 34 to enter and operatively to engage the gears 70, in which position the highest gear ratio exists between shaft 21 and the impeller 19 of the blower.

It will have been observed from the description of parts that the planetary arrangement of gears, best shown by Fig. 4, is particularly economical of space and reduces the requisite diameter or transverse dimension of the assembly of moving parts and the case, while the nested relation of companion gears such as 29 and 41, and the manner of journalling the gears 41 and 70 as by internally projecting elements of the case, makes for economy of axial dimension, it being noted that both sets of gears 70 and 41 are journalled in part in the projections 90 carried by or between the wall elements of the case 27.

It will further appear from the foregoing description that the variable-speed supercharger of the present invention is constructed so as more than adequately to resist the unusual centrifugal forces encountered because of the high speeds of rotation, and that the manner of interconnecting the constantly-driven with the intermittently-driven gearing is such that, until the initial inertia effects are overcome, the plungers 36 may first yieldably engage the scalloped internal surfaces of the related gears, and thus prevent any harmful effects incident to the unusual shearing stresses heretofore encountered. By virtue of these advantages, and in keeping with others heretofore expressed and implied, the assembly described fully attains each of the several objects above set forth.

While the invention has been described by making specific reference to an exemplary embodiment thereof, the foregoing is to be understood solely in a descriptive and not in a limiting sense, since numerous changes may be made in the parts, their arrangement and combinations, without departing from the full intended scope of the invention as defined by the appended claims.

We claim:

1. In an engine-blower drive assembly, a hollow shaft adapted as a mounting for a blower element, a drive shaft rotatably supporting the hollow shaft, a drive pinion on the hollow shaft, a pinion on the drive shaft, a train of gears including the said pinions, control means for selectively rendering the gear train operative and inoperative, including gear clutches internally of certain of the gears of the train, a separate clutch formed by interfitting elements on, and constituting a direct-drive connection between said shafts, the last said clutch elements being operable by relative axial displacement of the shafts, said control means including elements selectively operable to shift one of said shafts and make and break said shaft connection.

2. An engine-blower drive including a hollow impeller shaft, a drive shaft on which the impeller shaft is rotatably and shiftably mounted, means for directly connecting said shafts, a pinion on each of said shafts, the pinions being adjacently located, a pair of gears diametrally disposed exteriorly of each of said pinions and enmeshed therewith, each of said gears being aligned with a companion gear, a gear clutch operable internally of, and arranged selectively to connect and disconnect the said companion gears, a control cam, radially arranged plungers coacting with the cam to actuate the gear clutches, and means coacting with the cam relatively to shift the impeller and drive shafts into and out of direct operative connection.

3. A supercharger drive assembly including a hollow impeller shaft, a drive shaft on which the hollow shaft is mounted, a pinion on each of said shafts, a pair of coaxial gears, each enmeshing with one of said pinions, an axial passage in each of the coaxial gears, a gear-clutching element internally of the gears and movable along said passage for operatively connecting and disconnecting the coaxial gears, means associated with the clutching element and one of the gears, constituting an overload driving connection, means exteriorly engaging the coaxial passage therethrough, manual control means for the gear-clutching element arranged to establish a predetermined driving ratio between the impeller shaft and the drive shaft, and a clutch characterized by elements carried by the hollow shaft and drive shaft, said clutch being associated with said manual control means, and adapted selectively to permit a direct-drive connection between the impeller and drive shafts.

4. In an engine-blower drive assembly, a housing, a partition therein dividing the housing into compartments, a hollow shaft for carrying a blower element, operable in one of said compartments, said shaft including an axial extension projecting into an adjacent compartment of the housing, a drive shaft projecting into the last said compartment, and carrying the hollow shaft, interfitting portions on the shafts, and means coacting therewith relatively to displace the said shafts into direct operative connection, speed-change gearing in the last said compartment including a blower drive pinion on the said extension, a second pinion adjacently located on the drive shaft, a train of enmeshing gears in the last said compartment of the housing and including, in addition to the blower drive pinion and drive shaft pinion, a pair of coaxial gears, each engaging one of said pinions and adapted to establish a predetermined gear ratio therebetween, a gear clutch operable axially and internally of the said paired gears, and adapted selectively to connect and disconnect the paired gears, a manual control element accessible exteriorly of the housing, and means for translating the movement of the control element for actuation of the said gear clutch, said means including elements for selectively translating a movement of the control element for relatively shifting said shafts.

EDWARD J. SMITH.
EUGENE S. BUSH.